United States Patent
Deman et al.

(10) Patent No.: US 9,939,001 B2
(45) Date of Patent: Apr. 10, 2018

(54) CONNECTION DEVICE FOR TWO FURNITURE PARTS TO BE CONNECTED TO EACH OTHER, AS WELL AS PIECE OF FURNITURE WHICH USES SUCH CONNECTION DEVICE

(71) Applicant: UNILIN, BVBA, Wielsbeke (BE)

(72) Inventors: Luc Deman, Izegem (BR); Luc Maertens, Lichtervelde (BE)

(73) Assignee: UNILIN, BVBA, Wielsbeke (BE)

( * ) Notice: Subject to any disclaimer, the term of this patent is extended or adjusted under 35 U.S.C. 154(b) by 487 days.

(21) Appl. No.: 14/427,203

(22) PCT Filed: Sep. 12, 2013

(86) PCT No.: PCT/IB2013/058486
§ 371 (c)(1),
(2) Date: Mar. 10, 2015

(87) PCT Pub. No.: WO2014/041498
PCT Pub. Date: Mar. 20, 2014

(65) Prior Publication Data
US 2015/0252831 A1    Sep. 10, 2015

Related U.S. Application Data

(60) Provisional application No. 61/700,092, filed on Sep. 12, 2012.

(51) Int. Cl.
*F16B 12/20* (2006.01)
(52) U.S. Cl.
CPC ...... *F16B 12/2027* (2013.01); *F16B 12/2009* (2013.01); *A47B 2230/0044* (2013.01); *A47B 2230/0048* (2013.01); *Y10T 403/7066* (2015.01)

(58) Field of Classification Search
CPC ...... F16B 12/20; F16B 12/24; F16B 12/2009; F16B 12/2027; F16B 12/2036;
(Continued)

(56) References Cited

U.S. PATENT DOCUMENTS

| | | | | |
|---|---|---|---|---|
| 5,586,364 A | * | 12/1996 | Ferrari | E05D 5/0276 16/383 |
| 5,626,450 A | * | 5/1997 | Ferrari | A47B 88/427 411/180 |

(Continued)

FOREIGN PATENT DOCUMENTS

| | | | | |
|---|---|---|---|---|
| DE | 2546749 A1 | * | 4/1977 | F16B 12/2027 |
| DE | 2546751 A1 | * | 4/1977 | F16B 12/2027 |

(Continued)

OTHER PUBLICATIONS

International Search Report (ISR) dated Jan. 30, 2014, for PCT/IB2013/058486.
Written Opinion dated Jan. 30, 2014, for PCT/IB2013/058486.

*Primary Examiner* — Daniel J Wiley
(74) *Attorney, Agent, or Firm* — Bacon & Thomas, PLLC

(57) ABSTRACT

Connection device for two furniture parts which have to be interconnected, with a first connection portion which is realized at least as a spreading system and which is intended for being provided in a recess in a first furniture part, with a second connection portion which is intended for extending outside of the recess for cooperating with a second furniture part in this manner, as well as an activation mechanism for activating the spreading system, wherein the spreading system comprises at least two mutually rotatable parts, a first part and a second part, respectively, wherein the mutual rotation of which, in function of the realized mutual angle position, effects a spreading effect.

26 Claims, 17 Drawing Sheets

(58) Field of Classification Search
CPC ............... F16B 12/103; F16B 12/106; A47B 2230/0044; A47B 2230/0048; A47B 2230/0033; A47B 2230/0051
See application file for complete search history.

(56) References Cited

U.S. PATENT DOCUMENTS

| | | | | |
|---|---|---|---|---|
| 5,669,108 | A * | 9/1997 | Ferrari | F16B 12/32 16/383 |
| 5,823,700 | A * | 10/1998 | Poworoznek | F16B 12/2036 403/245 |
| 6,257,796 | B1 * | 7/2001 | Salice | F16B 12/2009 403/231 |
| 7,390,069 | B1 * | 6/2008 | Ho | A47B 17/033 312/195 |
| 7,530,651 | B2 * | 5/2009 | Ho | A47B 47/042 312/196 |
| 2008/0084143 | A1 * | 4/2008 | Ho | F16B 12/2009 312/111 |
| 2009/0206613 | A1 * | 8/2009 | Hawang | E05B 65/006 292/57 |
| 2010/0202852 | A1 * | 8/2010 | Krause | F16B 12/2027 411/272 |

FOREIGN PATENT DOCUMENTS

| | | | | |
|---|---|---|---|---|
| DE | 202004000199 | U1 | 4/2004 | |
| EP | 0940587 | A2 | 9/1999 | |
| FR | 2360780 | A1 * | 3/1978 | ......... F16B 12/2009 |
| FR | 2445461 | A3 * | 7/1980 | ......... F16B 12/2027 |
| FR | 2927677 | A3 * | 8/2009 | ......... F16B 12/2009 |
| GB | 2076104 | A * | 11/1981 | ............. E05D 5/08 |

* cited by examiner

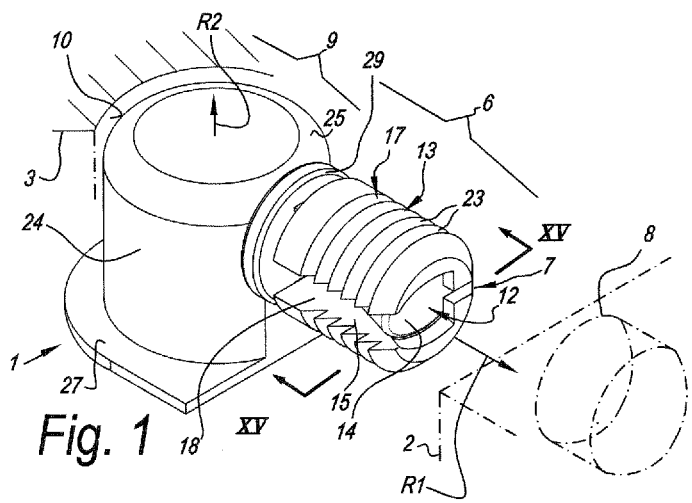
Fig. 1
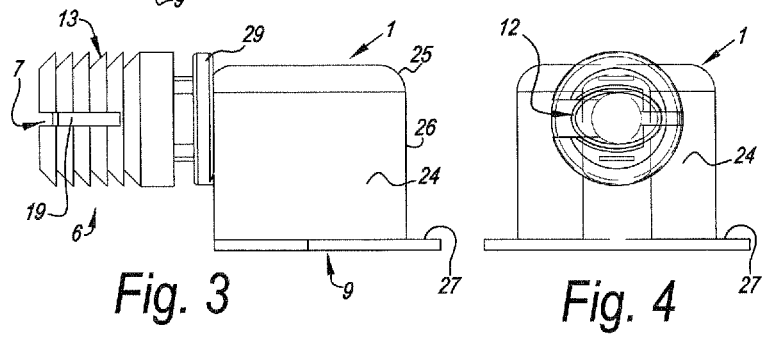
Fig. 2
Fig. 3
Fig. 4

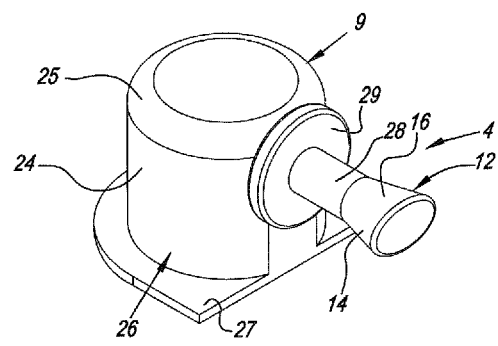
Fig. 5
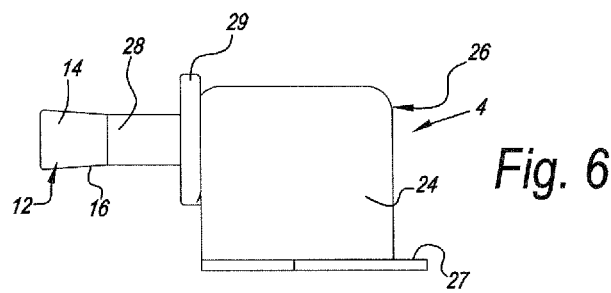
Fig. 6
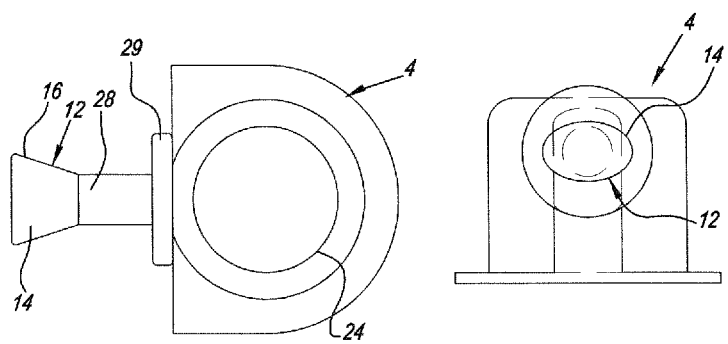
Fig. 7
Fig. 8

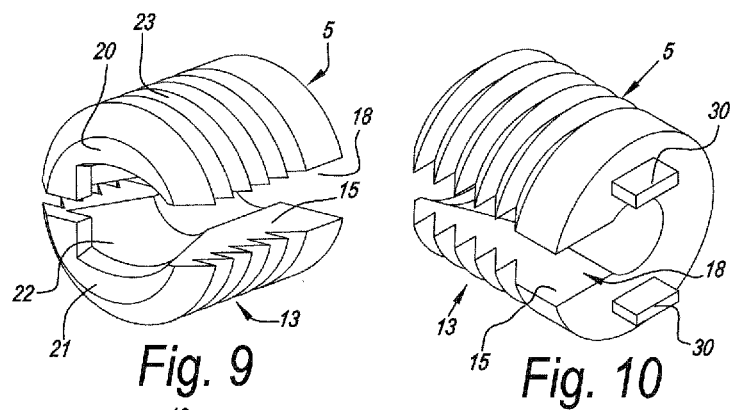
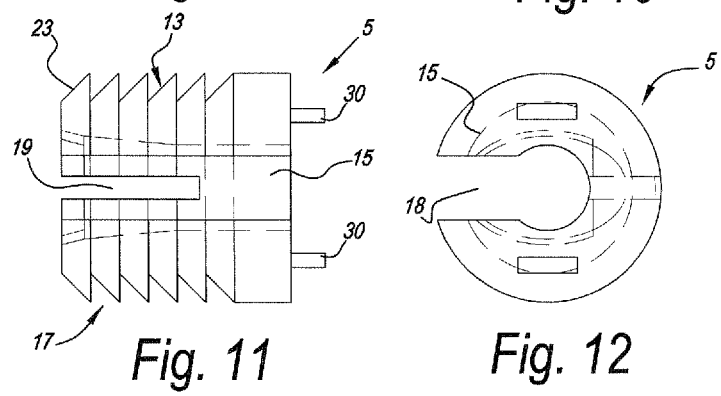
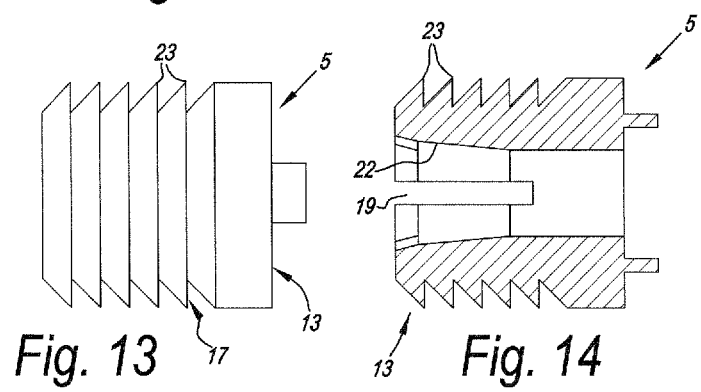

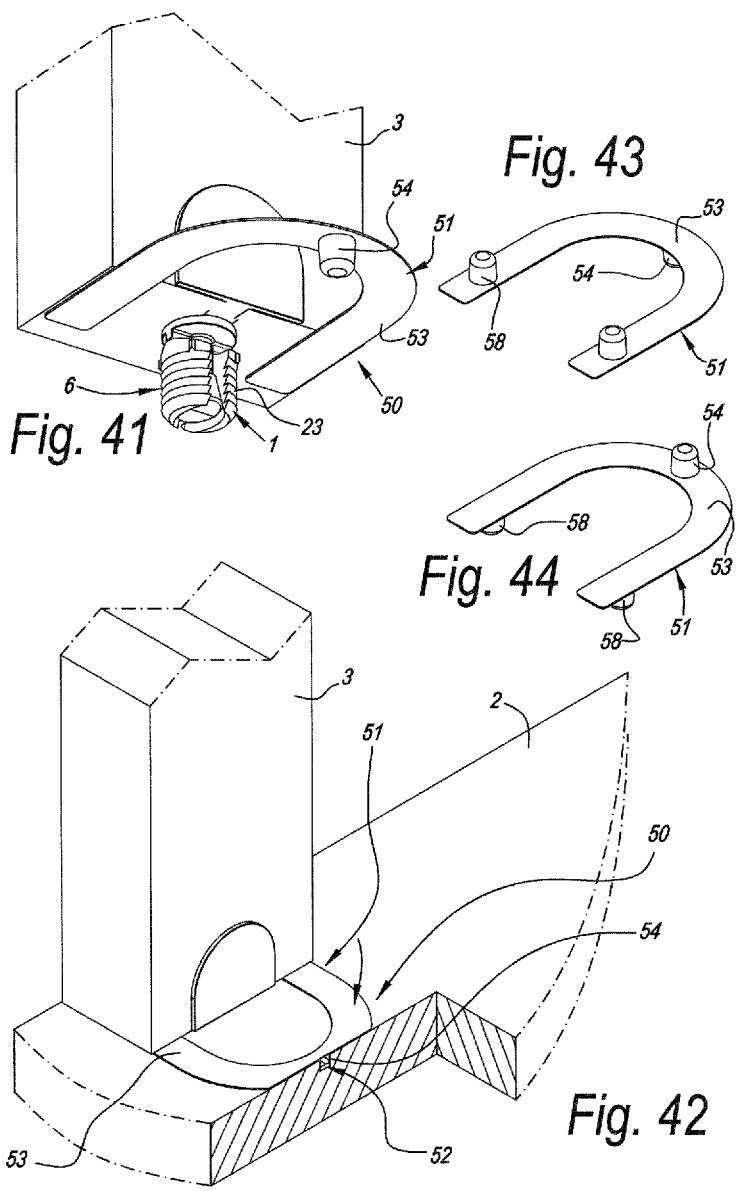

CONNECTION DEVICE FOR TWO FURNITURE PARTS TO BE CONNECTED TO EACH OTHER, AS WELL AS PIECE OF FURNITURE WHICH USES SUCH CONNECTION DEVICE

This application claims the benefit under 35 U.S.C. 119(e) to the U.S. provisional application No. 61/700,092 filed on Sep. 12, 2012.

BACKGROUND OF THE INVENTION

1. Field of the invention

This invention relates to a connection device for two furniture parts which have to be interconnected, as well as to a piece of furniture applying such connection device. Further, it also relates to a method for interconnecting two furniture parts.

More particularly, it relates to a connection device for two furniture parts which have to be interconnected, of the type consisting at least of a first connection portion which is realized at least as a spreading system and which is intended for being provided in a recess in a first furniture part, a second connection portion which is intended for extending outside of the recess for cooperating with a second furniture part in this manner, as well as an activation mechanism for activating the spreading system.

2. Related art

An example of a device of such type is known, amongst others, from the patent application EP 0.940.587.

SUMMARY OF THE INVENTION

As a first purpose, the present invention aims at an alternative to the known embodiments of the aforementioned type, wherein a smooth assembly is possible.

Further, the invention, at least in a preferred embodiment, aims at a connection device which allows realizing a connection without the necessity of using a tool, such as a screwdriver or the like.

Another purpose, which at least is striven for in a preferred embodiment, is working with a spreading system which can create a tensioning effect without having to realize a considerable axial displacement in the spreading system to this end. In certain applications, such axial displacement in fact is less desirable.

To this aim, the invention relates to a connection device for two furniture parts which have to be interconnected, with a first connection portion which is realized at least as a spreading system and which is intended for being provided in a recess in a first furniture part, with a second connection portion which is intended for extending outside of the recess for cooperating with a second furniture part in this manner, as well as an activation mechanism for activating the spreading mechanism, with the characteristic that the spreading system comprises at least two mutually rotatable parts, a first part and a second part, respectively, the mutual rotation of which, in function of the realized mutual angle position, effects a spreading effect. As, according to the invention, the spreading effect can be realized simply by a variation in angle position between a first part and a second part of the spreading system, a smooth and fast attachment is possible.

According to a preferred characteristic, the activation mechanism is formed in that one of said mutually rotatable parts is connected to the second connection portion or to a component thereof, such that the activation mechanism can be activated by means of a rotation performed on the second connection portion. Hereby, the advantage is obtained that, by a minimum of operations, the connection device can be clamped with its first connection portion into a recess provided for this purpose. Hereby, it is sufficient to exert a rotation on the protruding second connection portion only.

Preferably, the connection device is characterized in that the spreading system can adopt a first position, in which there is no forced spreading or a minimal forced spreading, and a second position, in which a maximum forced spreading exists, and that the activation system is configured such that the spreading system can move from the first into the second position with a mutual rotation of less than half of a turn, and preferably with approximately a quarter of a turn. As for activation only a small and preferably predetermined rotation is necessary, the advantage is obtained that the spreading system can be brought into a tensioned condition by means of a particularly simple operation. This also allows, at least in certain embodiments, providing the connection device first with the first connection portion in a first furniture part and providing it with the second connection portion in a second furniture part, in order to activate only then said spreading system, such by subjecting the furniture parts to a mutual rotation, for example, by rotating one of the furniture parts a quarter of a turn, wherein this furniture part, at the end of said rotation, then must end in its correct final position.

In a practical embodiment, said first part of the spreading system consists of an element with, in respect to the diameter, variable dimensions, more particularly a cam, whereas the second part consists of a spreadable body which is present at the circumference thereof, in such a manner that, by rotating said element or the cam, this element with a larger diameter is placed between the spreadable body and spreading takes place. Herein, it is further preferred that the first part has a non-cylindrical, however, in fact a round and in particular an elliptical or oval cross-section. The advantage is that an element can be applied, more particularly a cam, having a relatively simple shape, which is advantageous in view of the technical production.

In a preferred embodiment, the first part is also made conically narrowing towards the second connection portion in order to realize a tensioning force in axial direction, too. In this manner, it can be achieved that during the activation of the spreading system not only a clamping is obtained of the first connection portion in the recess provided for this purpose, but that also the furniture parts which have to be interconnected, are tensioned against each other.

Further, it is preferred that the first part of the spreading system is made in one piece with the second connection portion. This assembly then can be realized in one piece in a simple manner.

Preferably, the second part of the spreading system is realized as a spreadable sleeve-shaped body or a spreadable plug, which may or may not be composed of one or more parts and preferably consists of a split bushing and more particularly of a bushing split in two parts.

It is clear that on the circumference of the second part also ribs, a toothing or the like can be present for effecting a better grip.

In free condition, the second part of the spreading system remains present on the first part by itself in that it is seated around it in a form-fitting manner.

In the most preferred embodiment, the second connection portion is realized as an insertion part, more particularly an insertion body, as a result of which it can easily engage in a furniture part.

According to another preferred embodiment, the first connection portion as well as the second connection portion are made as insertion portions which each are characterized by a pertaining insertion direction, wherein the insertion directions are situated transverse to each other and preferably are situated perpendicular or almost perpendicular to each other.

According to another preferred characteristic, the first connection portion and the second connection portion each extend according to a longitudinal axis, wherein these longitudinal axes extend according to mutually differing directions and preferably are situated at an angle of 90 degrees or substantially 90 degrees in respect to each other. The invention shows its benefits in particular in applications wherein a connection has to be realized at such angle.

The direction, or, thus, spreading direction according to which said spreading system is active, can be chosen in function of the application in different directions. According to a first possibility, the spreading system is characterized by a spreading direction which extends transverse in respect to the longitudinal axis of the second connection portion. According to a second, different position, the spreading system is characterized by a spreading direction which extends substantially parallel to the longitudinal axis of the second connection portion.

Of course, it is also not excluded to use a spreading system which is not characterized by a specific main spreading direction, however, wherein the spreading is performed according to a plurality of radial directions.

According to another particular characteristic of the invention, the connection device is characterized in that it is provided with a tensioning system by which a tensioning can be effected of the second connection portion towards the second part of the first connection portion, preferably a tensioning according to an axial direction of the first connection portion, wherein this tensioning system preferably is integrated in said spreading system. By means of such tensioning, it is guaranteed that the two furniture parts in the finally assembled condition adjoin at least narrowly against each other and preferably are also clamped against each other with a certain tension force.

In a preferred embodiment, means are provided which, when tensioning the tensioning system, allow that the second connection portion is moved towards the second part of the first connection portion. These means can be of any kind.

According to a first possibility, deformation parts are applied, which will also be explained in the further description, and according to a second possibility, portions are applied which can rotate along each other and, as a result of this rotation, can engage deeper in each other than in an initial position.

According to another particular characteristic, the connection device comprises means which with said rotation provide for a perceptible final position, in which the spreading effect of the spreading system preferably is maximum. In this manner, the person assembling the piece of furniture automatically knows when the two furniture parts have arrived in the mounted condition.

According to another particular characteristic, the connection device comprises retaining means for retaining the second connection portion in the respective furniture part. This prevents that said second connection portion and the furniture part in which it is present can come loose from each other.

Amongst others, said retaining means can be realized according to one or more of the following possibilities:
as clamping means;
as clamping means in the form of clamping ribs;
as a locking means;
as a locking means with one or more hook-shaped locking parts which engage behind an edge at the respective furniture part, such as behind a collar or the like;
as a locking means in the form of an element which is provided through an opening in the second connection portion, on which, as aforementioned, one or more hook-shaped locking parts are present, which can engage behind an edge at the furniture part, as well as with a stop-forming part which retains the second connection portion in the mounted position;
as a locking means as in the preceding paragraph, with a part which can be inserted from the outside, for example, in the form of a plug, which forces and/or retains the locking parts in a locking position.

According to another preferred embodiment, the connection device is characterized in that it comprises positioning and/or blocking means which prevent or counteract a rotation of the second part in the respective recess and/or provide for a positioning of the second part in the recess. These means preferably comprise one or more of the following possibilities:
the second part is configured such that it fits with a clamping fit in the respective recess;
the second part is provided with a structure, such as ribs and/or a toothing providing for an engagement effect;
the first connection portion, and preferably the second part thereof, as well as the recess are provided with portions engaging in each other, which, in a certain position, fit into each other.

In a particular embodiment, the connection device of the invention is characterized in that it comprises a blocking system which, in the mounted final position, locks the second connection portion and the furniture part cooperating therewith against rotation in respect to the other furniture part. This blocking system can be realized, amongst others, according to any of the following possibilities:
a pen, plug or the like, which prevent a rotation;
a locking part, provided on the second connection portion, whether or not made in one piece therewith, which, in said final position, engages in a recess;
a locking part cooperating with the respective furniture part, which locking part, in said final position, engages in a recess;
a locking part according to any of the preceding two paragraphs, formed as an elastically bendable lip, with a protrusion which is forced into the recess by the elastic lip when the protrusion, by rotation, has been brought in a position opposite to the recess.

The present invention also relates to a piece of furniture comprising at least two furniture parts, which are interconnected by means of a connection device according to any of the preceding embodiments.

According to a preferred embodiment, at least one of the furniture parts consists of a lath which, at least at one end face, connects to a second furniture part and thereby is connected by means of the connection device. In fact, it is in particular with such application that the invention can be applied in a useful manner. Herein, said lath can be an upstanding post of a cabinet, and more particularly a so-called "centerpost".

Further, it is preferred that the whole is configured such that the second connection portion can be provided in one of the furniture parts by means of an insertion movement, after which the spreading system can be activated by rotating this furniture part in respect to the other furniture part.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIG. 1 represents a connection device according to the invention;

FIGS. 2 to 4 represent the connection device of FIG. 1 in different views;

FIGS. 5 to 8 represent a first component of the connection device of FIG. 1, such in different views;

FIGS. 9 to 14 represent a second component of the connection device of FIG. 1, such in different views;

FIGS. 41 to 43 illustrate a further variant of the invention;

DETAILED DESCRIPTION OF THE INVENTION

Figure 15:
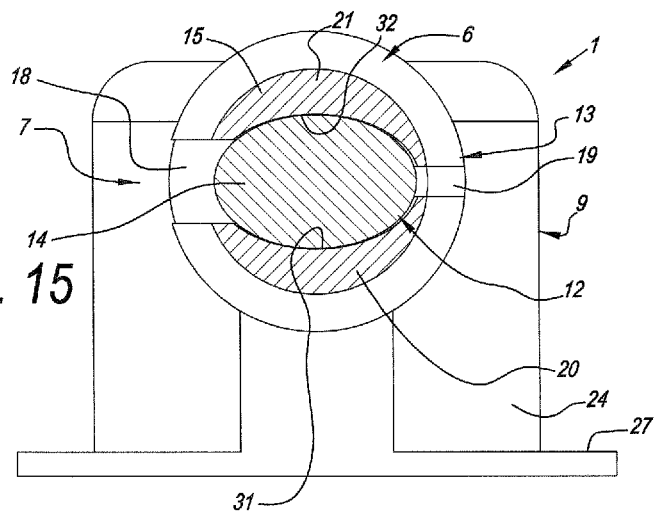
FIGS. 15 and 16 represent the functional principle of the spreading system, such according to cross-sections corresponding to line XV-XV in FIG. 1.

As represented in FIG. 1, the invention relates to a connection device 1 for interconnecting two furniture parts, which latter are represented in FIG. 1 very schematically only and are indicated by references 2 and 3, respectively.

In the represented embodiment, the connection device 1 itself is composed of two components 4 and 5. FIGS. 1 to 4 represent these components 4-5 in mounted together condition, whereas FIGS. 5 to 8 represent the first component only and FIGS. 9 to 4 exclusively represent the second component 5. It is noted that the construction of the connection device 1 of two components 4-5 is particularly convenient, however, that the invention is not limited to the respective two-component construction.

As represented in FIGS. 1 to 4, the connection device 1 comprises a first connection portion 6, which is realized at least as a spreading system 7 and which is intended for being provided in a recess 8 in a first furniture part 2, a second connection portion 9 which is intended for extending outside of the recess 8 for cooperating with a second furniture part 10 in this manner, for example, also with a recess 10, as well as an activation mechanism 11 for activating the spreading system 7.

According to the invention, the spreading system 7 comprises at least two mutually rotatable parts, a first part 12 and a second part 13, respectively, wherein the mutual rotation of which, in function of the realized mutual angle position, effects a spreading effect.

As can be seen in the respective figures, said first part 12 of the spreading system 7 substantially consists of an element 14 with, in respect to the diameter, variable dimensions, more particularly a cam, whereas the second part 13 consists of a spreadable element or body 15, which is present at the circumference thereof, said body herein below also called sleeve-shaped body 17.

By "dimensions variable in diameter" is meant that there are different dimensions in function of the direction of the diameter. In the represented example, to this aim the first part 12, seen in cross-section, is realized as a cam having a substantially elliptical cross-section. Moreover, the first part 12 of the spreading system is made conically narrowing towards the second connection portion 9 in order to effect a tensioning force in the axial direction as well. This conical shape, more particularly the conical outer wall 16, is clearly visible in FIGS. 5 to 7.

The second part 13 of the spreading system 7 is realized as a spreadable sleeve-shaped or plug-shaped body 17. As can be seen in particular in FIGS. 9 to 14, in the represented example this second part 13 is made in one piece in the form of a split sleeve or bushing, more particularly a bushing which is split on one side over the entire length by means of a slit 18. Opposite thereto, as represented, a partially continuous slit 19 can be formed in order to obtain that the portions 20-21 situated opposite to each other can be smoothly spread apart.

The body 17 preferably has a conical inner wall 22, which is intended for cooperating with the conical outer wall 16 of the first part 12.

The second part 13 can be provided laterally over the first part 12, for example, via the slit 19 and with a certain elastic deformation. The two parts 12 and 13 remain present at each other due to their form-fit.

As represented, the second part 13 can be provided with a toothing 23 on its exterior for guaranteeing a better engagement in mounted condition.

Said second connection portion 9 is made as an insertion part, more particularly as an insertion body. As illustrated, preferably a substantially cylindrical body 24 is applied having a rounded or inclined upper edge 25. Alternatively, this body 24 can be made slightly conical in order to facilitate the insertion thereof in a furniture part. Also, at the outer surface 26 thereof not represented ribs can be provided, for example, axially directed ribs, for effecting a clamping or better clamping. In order to economize material, the body 24 can be made hollow to a lesser or greater extent.

On the body 24, a stop-forming edge 27 is formed for restricting the insertion movement.

It is clear that according to the example represented in the figures, both the first connection portion 6 and the second connection portion 9 are realized as insertion portions which each are characterized by a pertaining insertion direction R1, R2, respectively, wherein the insertion directions R1 and R2 are situated transverse to each other and in this case are situated perpendicular to each other.

As is clearly visible in FIGS. 5 to 7, the first part 12 of the spreading system 7 is made in one piece with the second connection portion 9. Herein, the conical element 14 is connected to said body 24 via an intermediate portion 28.

Also, a positioning portion 29 is provided with which the second connection portion 6 can be provided centrically in a recess 8.

In the example, also deformation parts 30 are provided, which can be axially compressed and/or will break off when, during tensioning, a slight axial displacement would occur or is desirable between said second part 13 of the spreading system 7 and the second connection portion 9.

It is clear that in the example, the activation mechanism 11 is formed in that the first part 12 is connected to the second connection portion 9, such that the activation mechanism can be activated by means of a rotation exerted on the second connection portion 9.

Figure 16:
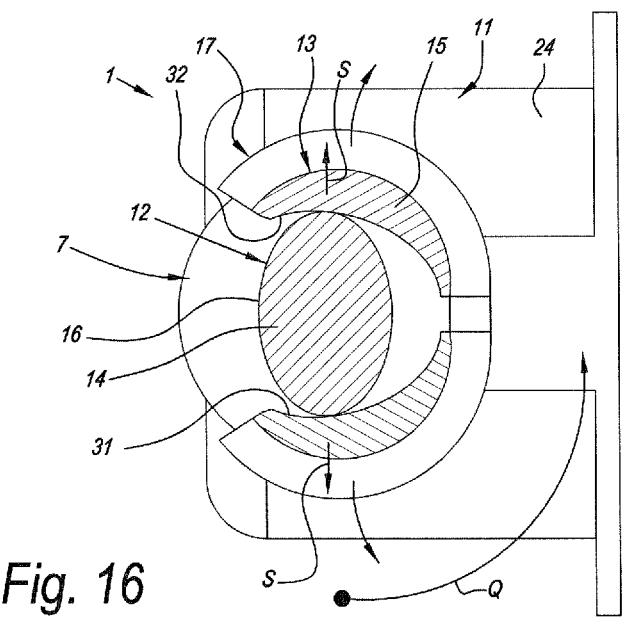

FIGS. 15 and 16 illustrate the functioning of the spreading system 7. FIG. 15 represents a first position in which there is no forced spreading or a minimal forced spreading. By a mutual rotation, as in FIG. 16, such over a quarter of a turn Q, the spreading system 7 is forced into a maximally spread position. It is clear that herein not only the cross-section of the element 14, in other words, the circumference of the cam 14, but also the cross-section of the inner walls 31-32 must have a suitable contour for obtaining such spreading effect, and it is evident that the person skilled in the art may develop different designs therefor.

Figure 17:
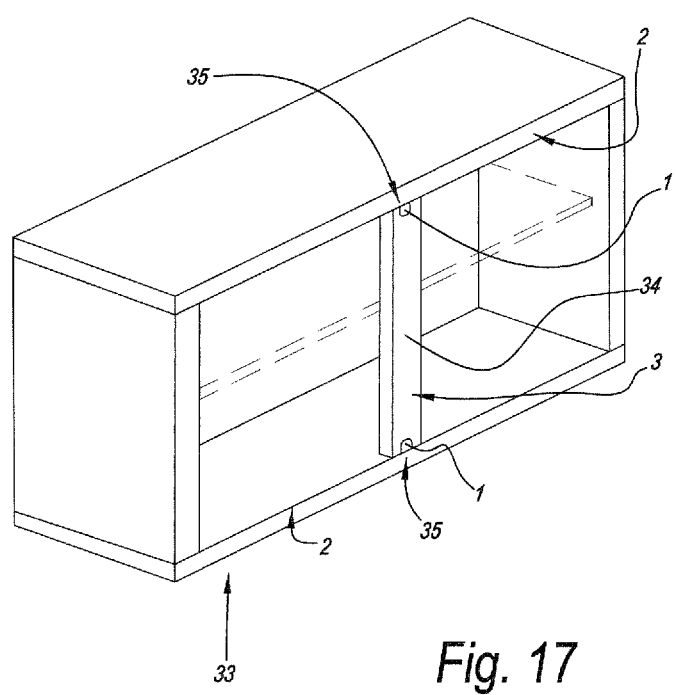
FIG. 17 represents a piece of furniture applying the connection device of preceding figures.

FIG. 17 represents a piece of furniture 33, wherein a lath 34, which forms a second furniture part, connects at both end faces 35 against first furniture parts 2, via connection devices 1 according to the invention. Herein, the lath concerns a post or stand, more particularly a so-called centerpost.

Figure 18:
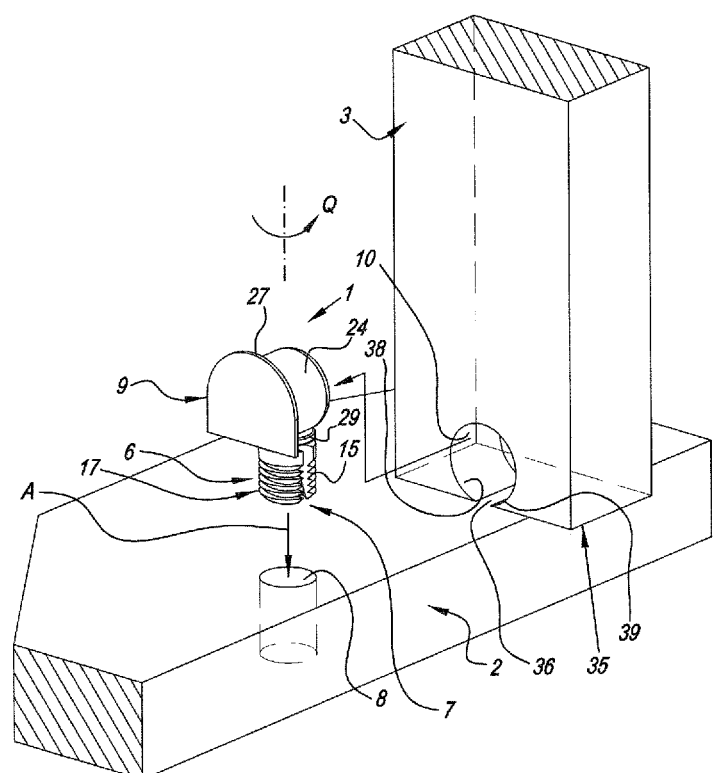
FIG. 18, at a larger scale, represents how the connection device is mounted in the piece of furniture of FIG. 17.

As can be seen in FIG. 18, herein the whole is configured such that the second connection portion 9 can be provided in the post via an insertion movement, after which the spreading system 7 can be activated by rotating the post over a quarter of a turn.

More specifically, this is performed as follows. The furniture parts are provided with suitable recesses 8 and 10. On the one hand, this relates to a recess 8 in the form of a preferably not continuous bore hole in the furniture part 2 at a distance from the edge thereof. On the other hand, in the furniture part 3, in this case the lowermost extremity of the post, also a recess 10 is provided, which, however, partially crosses the respective end face 35 of the post, more particularly as illustrated in FIG. 18, such that there is a passage 36. During assembly, the connection device 1 first is pushed with the entire first connection portion 6, including the positioning portion 29, into the recess, according to arrow A, after which the stand or post is slid with the recess 10 over the body 24 into the position as illustrated. By subsequently rotating the post over a quarter of a turn Q, it gets into the final position and simultaneously a spreading effect and a good clamping of the first connection portion in the recess are effected.

It is clear that additional provisions can be made in order to prevent that a further continuing or returning rotation can take place. According to FIG. 17, the rotation of the post after attachment is prevented by the placement of a shelf 37 which, with its front edge, precisely comes to sit against the rear side of the post. Other forms of rotational locking are possible, such as providing a plug parallel next to the connection device 1.

It is clear that the invention is not restricted to the represented application. A large variation of other applications is possible. The represented connection device can be applied, for example, in the represented form as a shelf carrier. The connection device then is inserted with the first portion into a bore hole in a sidewall, after which manually a rotation is performed on the protruding second portion in order to effect clamping, in such a manner that in the final condition the body is directed upward. A shelf then can be provided with a downward-directed recess over the body 24.

A general characteristic, which preferably shall also be applied, is that the second connection portion and the pertaining recess, in mounted condition, provide for a mutual locking according to the axial direction of the first connection portion. In the example of FIG. 18, this is achieved in that the edges 38 and 39 engage behind the body 24. It is clear that in this manner connections can be effected which can be subjected to tension forces. This then can also be applied in any form of interconnection in a piece of furniture, for example, in connections between an upper and a bottom wall of a cabinet, or connections between two sidewalls, by which it can be counteracted that two such walls will move apart under the influence of a load.

It is clear that all applied components for realizing a connection device according to the invention can be manufactured in any material. It is important that it complies to the required stability, which can be determined by means of tests. For example, all components may consist of synthetic material, or all of metal. An advantageous combination is realizing the represented component 4 in metal, whereas the sleeve-shaped body, or thus the component 5, consists of synthetic material.

Figure 19:
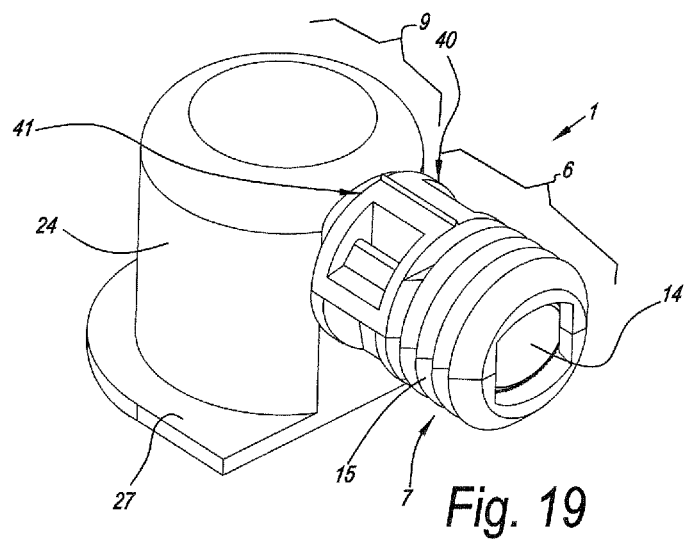
FIGS. 19 and 20 relate to a variant of a connection device according to the invention.
Figure 20:
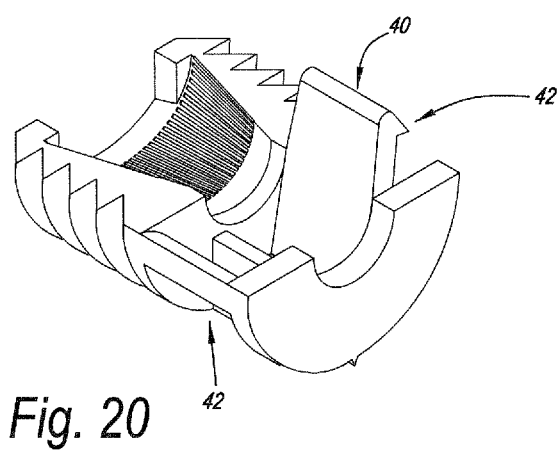

FIG. 19 represents a variant, wherein the second component consists of two loose parts 40-41, which can be snapped into each other by means of snap-on means 42 or the like around the first part 12. FIG. 20 represents one loose part 40 thereof. Both loose parts can be identical. It is clear that this pre-mounting can take place during manufacture and thus does not have to be performed by the user.

In FIGS. 21 to 36, a variant of the connection device 1 is represented.

Analogous to the embodiment of FIGS. 1 to 16, the connection device 1 comprises a first connection portion 6 and a second connection portion 9.

As represented, the first connection portion 6 and the second connection portion 9 extend according to respective longitudinal axes L1-L2, wherein these longitudinal axes preferably extend according to mutually different directions and preferably mutually are situated at an angle of 90 degrees or substantially 90 degrees.

The embodiment of FIGS. 21 to 36 differs from the embodiment of FIGS. 1 to 6 in a limited number of respects only.

A difference herein consists in that the spreading system 7 is characterized by a spreading direction S which extends transverse in respect to the longitudinal axis L2 of the second connection portion 9. In the embodiment of FIGS. 1 to 16, the spreading system 7, however, is characterized by a spreading direction S which, as indicated in FIG. 16, extends substantially parallel to the longitudinal axis of the second connection portion 9. Depending on the application in which the connection device 1 is applied, in one or other direction forces may occur which are of such a nature that the first part 12 is subjected to lateral forces, for example, tilting forces, and said part comes to sit in the gap 18, as a result of which the quality of the connection may be jeopardized. By now applying, in function of the application, such an embodiment that possibly occurring large lateral forces coincide with the spreading direction, the risk that the first part 12 comes to sit in the gap 18 is minimized. Taking this into account, the embodiment of FIG. 21, when attaching a "centerpost", mostly is preferred above the embodiment of FIG. 1.

Figure 21:
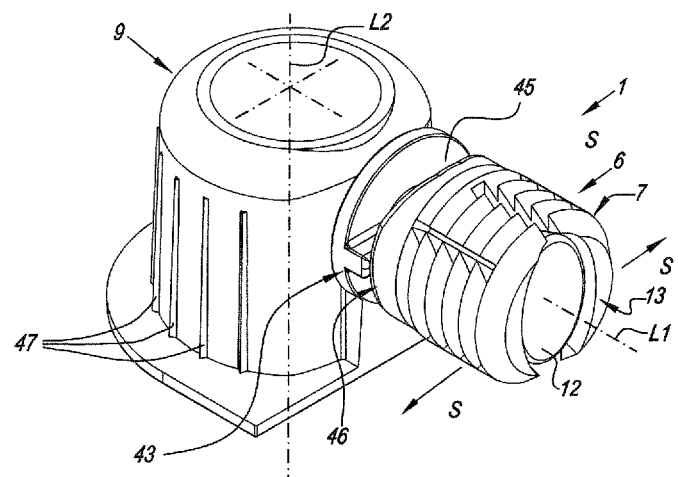
FIGS. 21 to 23, in different views, represent a variant of the invention.
Figure 22:
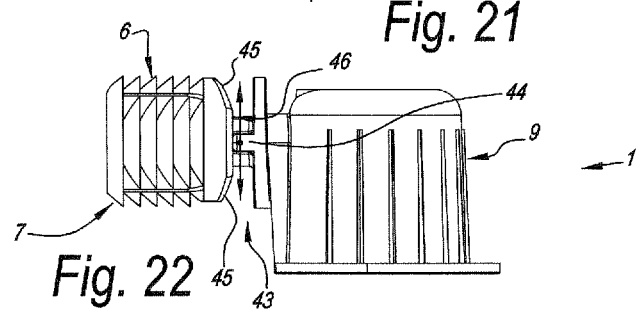
Figure 23:
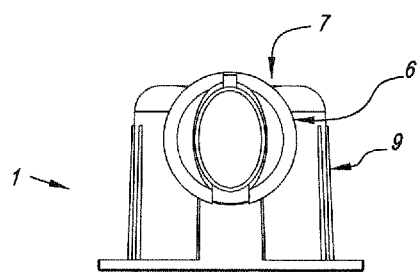
Figure 24:
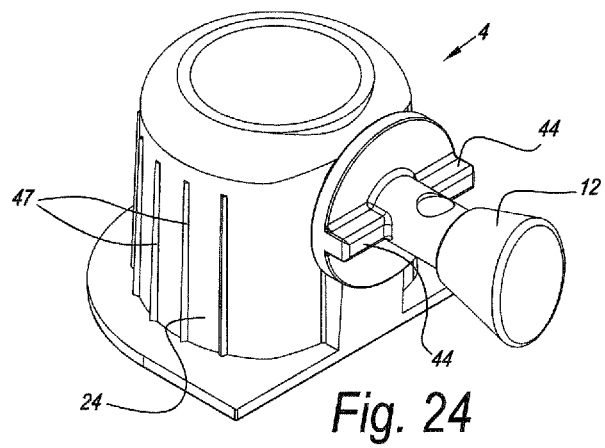
FIGS. 24 to 28 represent a first component of the embodiment of FIGS. 21 to 23, such in different views.
Figures 25, 26:
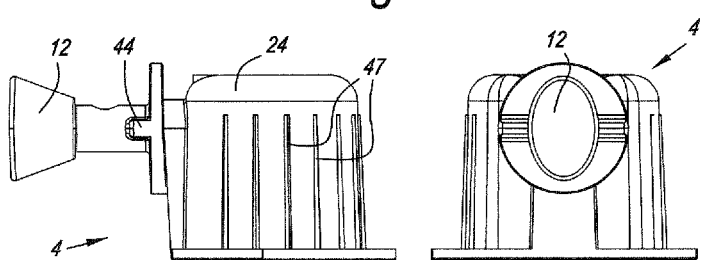
Figures 27, 28:
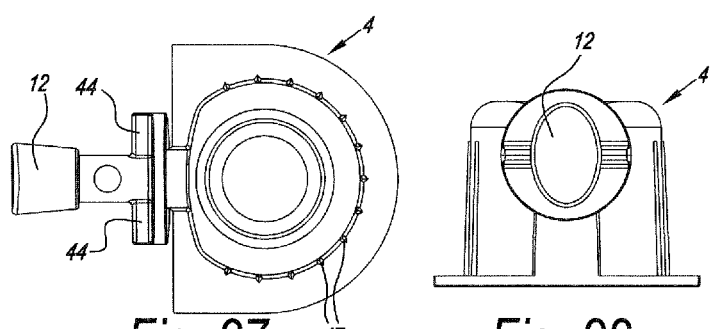
Figure 29:
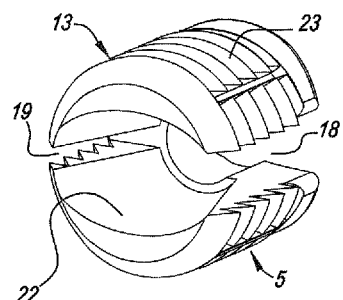
FIGS. 29 to 34 represent a second component of the embodiment of FIGS. 21 to 23, such in different views.
Figure 30:
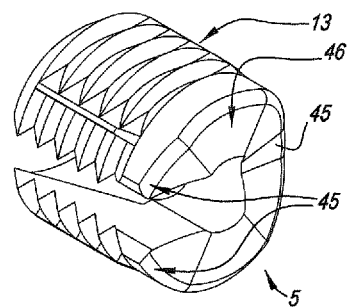
Figure 31:
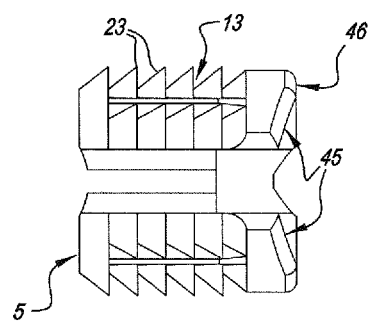
Figure 32:
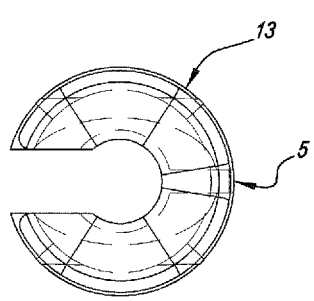
Figure 33:
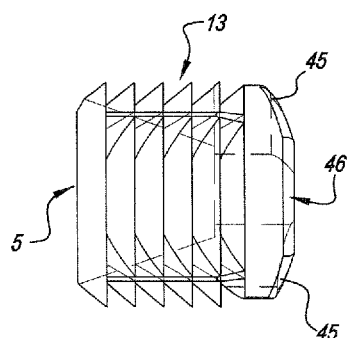
Figure 34:
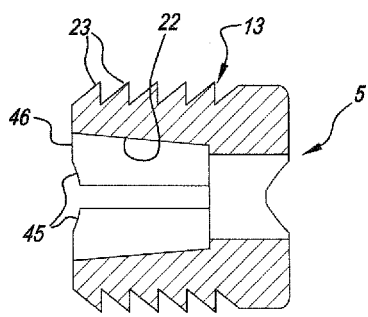

In the represented examples, the aforementioned difference manifests itself, amongst others, due to the fact that the oval-shaped element 14 in FIG. 1 is directed horizontal with the longest axis of the oval shape, whereas, on the contrary, in FIG. 21 this longest axis is vertical.

As mentioned in the introduction, the connection devices 1 according to the invention preferably are provided with a tensioning system with which a tensioning can be effected of the second connection portion 9 towards the second part 13 of the first attachment portion 6, preferably a tensioning according to an axial direction of the first attachment portion 6, wherein said tensioning system preferably is integrated into said spreading system 7. Further, herein preferably use is made of means 43, which, when tensioning the first connection portion 6, thus, when activating it, allow that the second connection portion 9 is displaced towards the second part 13 of the first connection portion 6, with the advantage that the furniture parts 2-3 are also drawn towards each other and thereby preferably are tensioned against each other. In the embodiment of FIGS. 1 to 16, these means are formed by the deformation parts 30 which, when the whole is tensioned, are compressed and/or deformed and/or pushed away.

Figure 35:
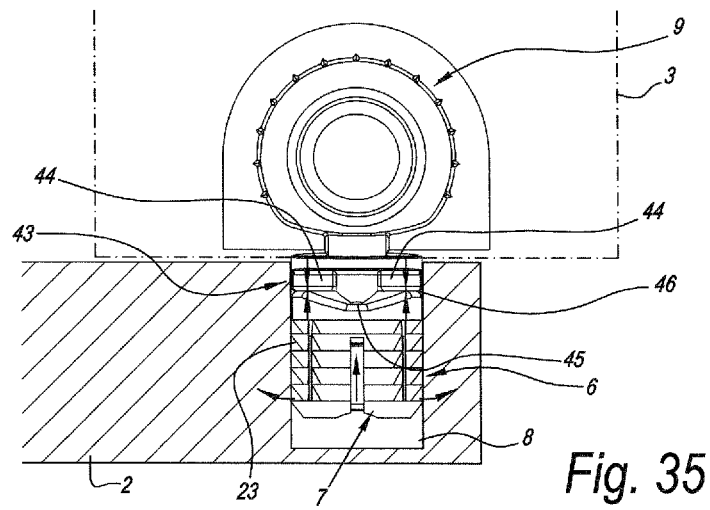
FIGS. 35 and 36 represent the connection device of FIGS. 21 to 23 in an application, for two conditions thereof.
Figure 36:
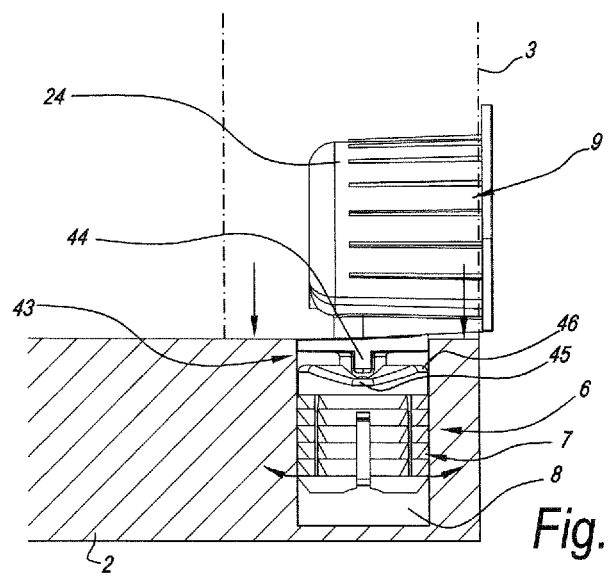

In the embodiment of FIGS. 21 to 36, these last-mentioned means 43 are formed by portions which rotate along each other and, during tensioning, can engage deeper in each other. In the example, these means 43 also are designed such that with said rotation a perceptible final position is provided in which the spreading effect of the spreading system 7 preferably is maximum. Herein, said portions are formed by the represented protrusions 44, on the one hand, and the narrow edge 46, which is provided with countersunk parts 45, of the second part 13, on the other hand. The working is illustrated in FIGS. 35 and 36 and is substantially as follows. In FIG. 35, the initial condition is represented in which a tensioning has not yet been realized. Herein, the connection device 1 is provided with the first connection portion 6 in the recess 8, whereas the furniture part 3 is slid on the body 24 of the second connection portion 9 and still has to be rotated into the final position. FIG. 35 thus represents a condition in which the furniture parts 2 and 3 are situated in a mutual position as in FIG. 18. In this condition of FIG. 35, the protrusions 44 are located against the not-countersunk portions of the edge 46. By subsequently rotating the furniture part 3, and thus also the second connection portion 9, a tensioning is realized in a manner analogous to that of FIGS. 15 and 16. By the conical shape of the first part 12, not only a radial tensioning is obtained, but also an axial tensioning, while the protrusions 44 rotate over the edge 46. When these protrusions 44 are situated opposite to the countersunk parts 14, this axial tensioning has as a consequence that the second connection portion 9 and the furniture part 3 attached thereto is drawn towards the furniture part 2, whereby a possible play among the furniture parts is removed.

The connection devices 1 according to the invention preferably are provided with retaining means for retaining the second connection portion 9 in the respective furniture part 3, such that the connection portion 9 and the furniture part 2 cannot or less fast come loose according to the respective insertion direction. In the embodiment of FIG. 1, these retaining means simply can consist in that the second connection portion 9, and more particularly the body 24, cooperates with the recess 10 with a clamping fit. Herein, the use of a somewhat conical body 24, such that a clamping is obtained at the end of the insertion only, is recommended.

In the embodiment of FIG. 21, these retaining means comprise clamping ribs 47. As mentioned in the introduction, the connection device preferably comprises positioning and/or blocking means which prevent or counteract a turning of the second part 13 in the respective recess 8 and/or provide in a positioning of the second part 13 in the recess, such before the connection device is activated, thus, before the first part is tensioned in the second part 13. In the preceding embodiments, these means are formed, amongst others, by the fact that the second part 13 is configured such that, in the initially mounted condition, it fits into the respective recess with a preferably slight clamping fit, wherein this second part 13 in the represented examples further is provided with a structure, in this case the aforementioned toothing 23, which provides for an engagement effect both in axial and in circumferential direction.

Figure 37:
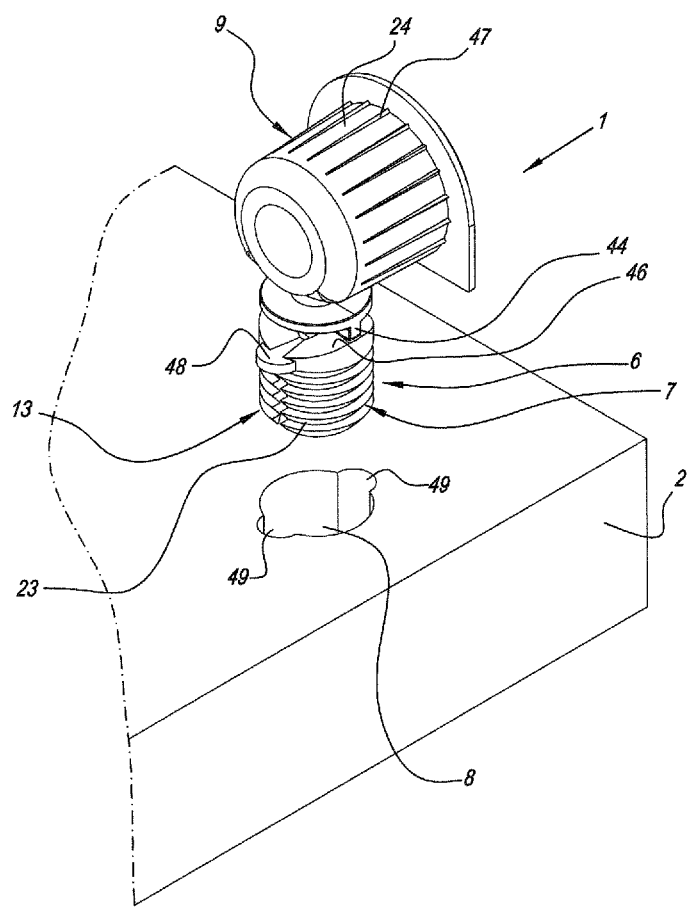
FIG. 37 represents another variant of the invention.

In FIG. 37, a variant is represented wherein said means are formed in that the first connection portion 6, and preferably the second part 13 thereof, as well as the recess 8, are provided with mutually engaging portions 48-49, which, in a well-defined position, fit into each other. In the represented example, use is made of one portion 48 in the form of a protrusion and two portions 49 in the form of recesses in which the protrusion 48 can become seated.

Figure 38:
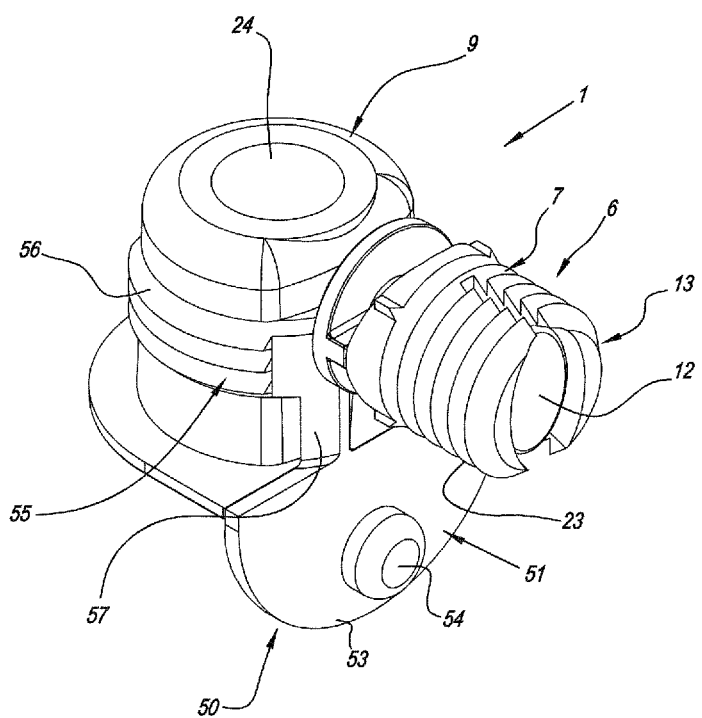
FIG. 38 represents another variant of the invention.
Figure 39:
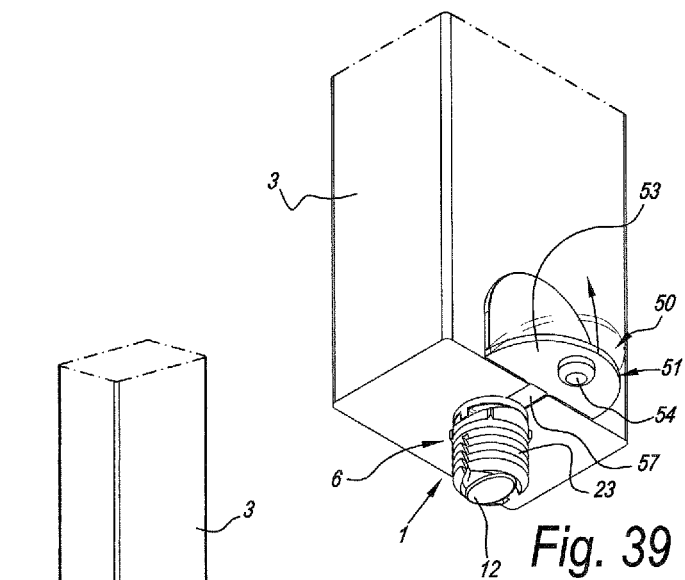
FIGS. 39 and 40 illustrate the use of the connection device of FIG. 38.
Figure 40:
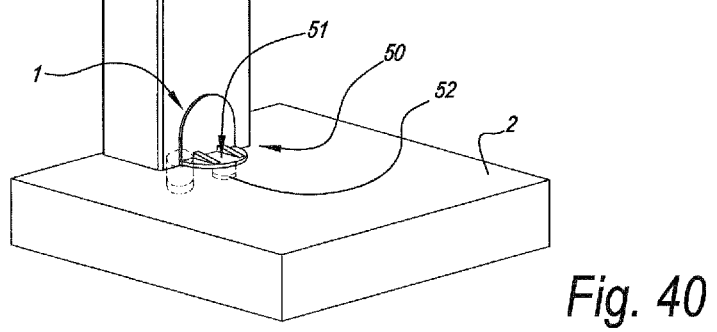

In FIGS. 38 to 40, an example of a connection device 1 according to the invention is represented, which comprises a blocking system 50 which locks the second connection portion 9 and the furniture part 3 with which it cooperates, in the mounted final position against rotation in respect to the other furniture part 2. In this example, the blocking system substantially is formed by a locking part 51 provided on the second connection portion 9, which locking part, in said final position, engages in a recess 52. As represented, said locking part 51 can be formed as an elastically bendable lip 53 with a protrusion 54 which is forced into the recess 52 by the elastic lip 53 when the protrusion 54 has been brought opposite to the recess 52 by rotation.

The locking part 51 may or may not be made in one piece with any of the remaining components of the connection device 1. In the embodiment of FIG. 38, the locking part 51 is made as a dismountable part and comprises a holder 55 with a portion 56 with which the holder is detachably provided around the body 24, as well as with a connection portion 57 to which the aforementioned lip 53 is attached. As represented, the holder 55 can also be provided with circumferential ribs, which may function as retaining means for the body 24. It is noted that the body 24, according to a not-represented embodiment, as such also can be provided with circumferential ribs, even when no blocking system 50 is applied.

The working of the blocking system 50 is represented in FIGS. 39 and 40. FIG. 39 represents how the whole is mounted in a furniture part 3. The lip 53 is elastically bendable, as represented in dashed line. By subsequently providing the furniture part 3 with the connection device 1 in the recess 8 of the furniture part 2 in the already above-described manner, the lip 51 is bent. By subsequently rotating the whole into the position in which the protrusion 54 is positioned opposite to the recess 52, this protrusion 54 will be forced into the recess 52 under the influence of the lip 51 which is bending back.

In FIGS. 41 to 42, a variant is represented wherein the blocking system 50 comprises a locking part 51 which cooperates directly with the furniture part 3 instead of with the actual connection device 1. Herein, the locking part 51, which also works as a kind of elastic lip, is provided with attachment portions 58 in the form of protrusions which fit into not represented openings, such as bore holes, in the end face of the furniture part 3, in such a manner as illustrated in FIG. 41. It is clear that the working is analogous to the case of FIG. 40. In FIG. 42, specifically the engagement of the protrusion 54 in the recess 52 is represented.

Figure 45:
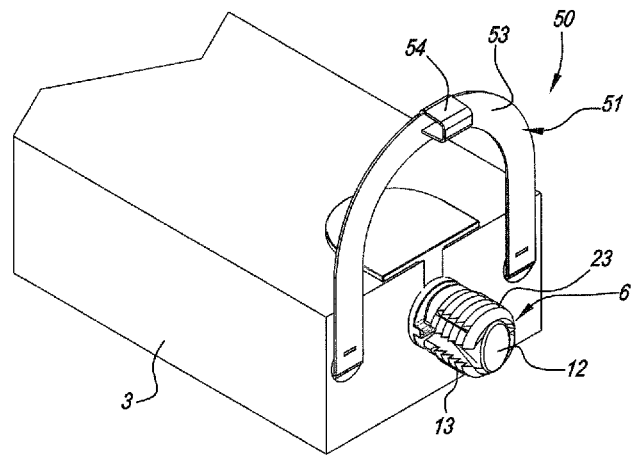
FIGS. 45 and 46 illustrate still another variant of the invention.
Figure 46:
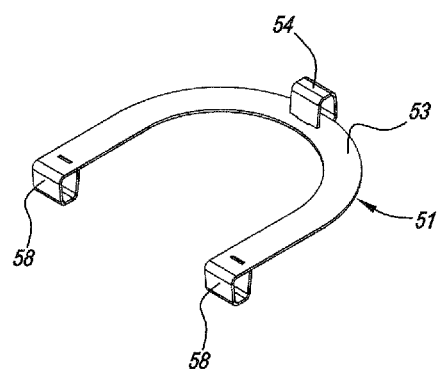

In FIGS. 45 and 46, a variant of the embodiment of FIGS. 41 to 42 is represented, wherein the protrusion 54 and the attachment portions 58 have a somewhat different design.

Figure 47:
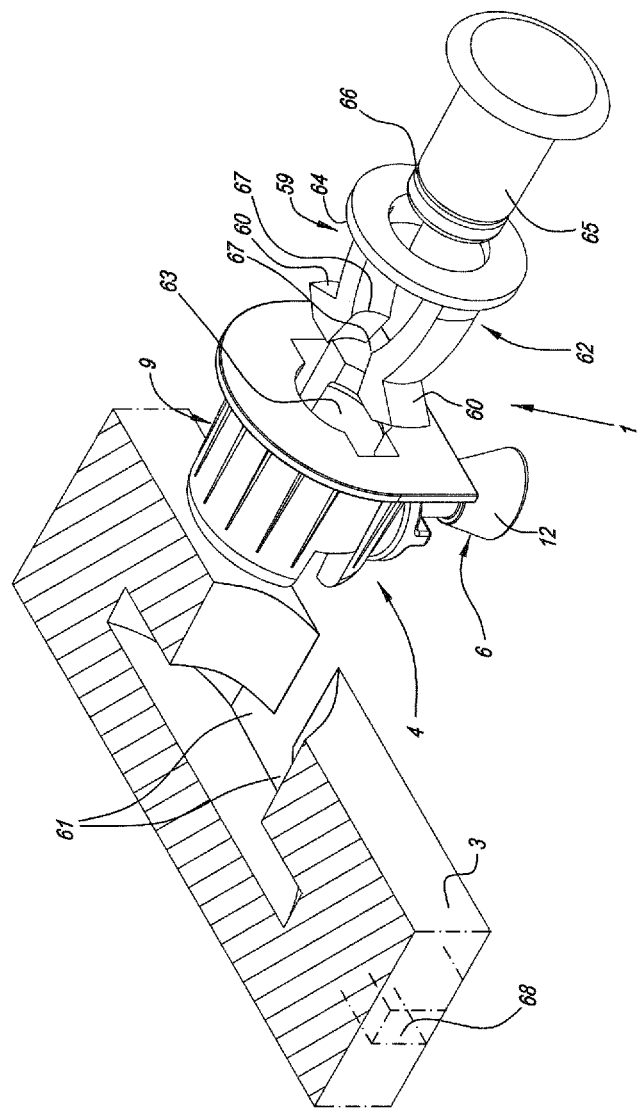
FIG. 47 in perspective represents another variant of the invention.

In FIG. 47, a particular embodiment of a connection device 1 according to the invention is represented. Herein, the aforementioned retaining means consist of a locking means 59 with hook-shaped locking parts 60 which engage behind an edge 61 on the furniture part 3 concerned, more particularly an edge in the form of a collar or the like.

In the example, use is made of a locking means 59 in the form of an element 62 which is provided through an opening 63 in the second connection portion 9, on which, as aforementioned, one or more hook-shaped locking parts 60 are present, which can engage behind an edge 61 on the furniture part 3, as well as with a stop-forming part 63, which retains the second connection portion in the mounted position. Further, the locking means 59 comprises a part 65 which can be inserted from the outside, preferably in the form of a plug, which can force and/or hold the locking parts 60 in a locking position. On the part 65 in its turn locking parts can be present for holding it in place after mounting, which locking parts in the example are formed by a recess 66 which can cooperate with edges 67.

The working of the locking means 59 can simply be deduced from FIG. 47. It substantially consists in that, after the second connection portion 9 is provided in the furniture part 3, this is retained in the respective opening by pushing the element 62 through the opening 63, as well as providing the part 65 in the element 62, all this until the locking parts 60 engage behind the edge 61.

In the example of FIG. 47, the edge 61 is formed by a circular collar. However, it is clear that any edge or collar can be taken into account. So, for example, such collar may also be obtained by providing a groove 68 in the end face of the furniture part 3, said groove being made continuous, of which groove only a portion is indicated schematically in FIG. 47. The production of such straight groove is considerably simpler than the production of a circular undercut.

It is noted that the connection device 1 can consist of any suitable material, wherein whether or not different materials are applied for the respective components. Preferably, however, the first component 4 shall be made of metal, whereas the second component 5 and the possible other component parts consist of synthetic material.

It is noted that in the context of the present invention, by a "furniture part" any component can be understood which is used in constructing a piece of furniture. This then also means that such connection device can be applied, for example, for interconnecting actual furniture parts, such as panels, posts and the like, as well as for attaching a fitting component, such as, for example, a rail for a drawer or a hinge, against a wall or the like. The second connection portion then can be made as a knob or wing nut which can be rotated for activating the spreading effect.

Further, it is clear that the invention also relates to a method for mounting a piece of furniture, more particularly for attaching two furniture parts to each other, with the characteristic that the basic technique described by means of FIG. 18 is applied.

It is noted that said second component, or thus the spreadable part, generally can be made such that it can be fixedly engaged on the first component, such that both components stay together prior to the application of the connection device 1 and can be marketed in joined condition.

The second component may also adopt various forms. It is clear that it does not necessarily have to be made as a split body, but that this component can also be made, for example, as a continuous, for example, tube-shaped, body, for example, consisting of synthetic material, which can be simply spread radially open by means of a suitable cooperation with the first part.

It is also noted that the term "spreading system" must be interpreted in a broad sense and in fact comprises any system with which a tensioning effect can be realized in a recess. In FIG. 16, schematically a substantial spreading is represented; however, in reality this may also relate exclusively to a radial tensioning. Indeed, it is so that the second part 13 is provided in the recess 8 with, for example, a slight clamping and that thus the subsequent spreading is very small and almost zero and substantially manifests itself as a radial pressing-on towards the outside. Normally seen, however, there will always be a spreading on the inner side of the second part 13, which spreading then results in a spreading and/or tensioning on the outer side of the second part.

The fact that the mutual rotation between the first part and the second part, in function of the realized mutual angle position, effects a spreading effect, means, in the broadest sense, that there are at least two angle positions, wherein at least in one position a more spread or tensioned condition of the spreading system is obtained than in the other position.

The present invention is in no way limited to the embodiments described by way of example and represented in the figures; on the contrary, such connection device, as well as the application thereof in a piece of furniture, can be realized according to various variants without leaving the scope of the invention.

The invention claimed is:

1. A connection device for two furniture parts which have to be interconnected, with a first connection portion which is realized at least as a spreading system and which is intended for being provided in a recess in a first furniture part, with a second connection portion which is intended for extending outside of the recess for cooperating with a second furniture part, as well as an activation mechanism for activating the spreading system, wherein the spreading system comprises at least two parts, a first part and a second part, respectively, one part thereof being rotatable in respect to the other so that they can occupy a different rotational position in respect to each other, wherein the relative rotation between the first part and the second part, in function of the thereby realized rotational position, effects a spreading effect at the spreading system in at least one spreading direction.

2. The connection device of claim 1, wherein the activation mechanism is formed in that one of said two parts is connected to the second connection portion or to a component thereof, such that the activation mechanism is able to be activated by means of a rotation performed on the second connection portion.

3. The connection device of claim 2, wherein the spreading system can adopt a first position, in which there is no forced spreading or a minimal forced spreading, and a second position, in which a maximum forced spreading exists, and wherein the activation mechanism is configured such that the spreading system can move from the first to the second position with a mutual rotation of less than half of a turn.

4. The connection device of claim 2, wherein the first part of the spreading system is made in one piece with the second connection portion.

5. The connection device of claim 2, wherein the second part of the spreading system is realized as a spreadable sleeve-shaped body, which consists of a split bushing.

6. The connection device of claim 2, wherein the first connection portion as well as the second connection portion are made as insertion portions which each are characterized by a pertaining insertion direction, wherein the insertion directions are situated transverse to each other and are situated perpendicular or almost perpendicular to each other.

7. The connection device of claim 2, wherein the first connection portion and the second connection portion each extend according to a longitudinal axis, wherein these longitudinal axes extend according to mutually different directions and are situated at an angle of 90 degrees or substantially 90 degrees in mutual respect.

8. The connection device of claim 7, wherein the spreading system is characterized by a spreading direction which extends transverse in respect to the longitudinal axis of the second connection portion.

9. The connection device of claim 7, wherein the spreading system is characterized by a spreading direction which substantially extends parallel to the longitudinal axis of the second connection portion.

10. The connection device of claim 2, said connection device being provided with a tensioning system with which a tensioning is able to be effected of the second connection portion towards the second part of the first connection portion, wherein the tensioning is according to an axial direction of the first connection portion, wherein this tensioning system is integrated in said spreading system.

11. The connection device of claim 10, comprising means which, when tensioning the tensioning system, allow that the second connection portion is displaced towards the second part of the first connection portion.

12. The connection device of claim 2, comprising means which, with the aforementioned rotation, provide for a perceptible final position in which the spreading effect of the spreading system is maximum.

13. The connection device of claim 2, comprising retaining means for retaining the second connection portion in the respective furniture part.

14. The connection device of claim 13, wherein the retaining means are realized according to one or more of the following possibilities:
- as clamping means;
- as clamping means in the form of clamping ribs;
- as a locking means;
- as a locking means with one or more hook-shaped locking parts which engage behind an edge on the respective furniture part;
- as a locking means in the form of an element which is provided through an opening in the second connection portion, on which, as aforementioned, one or more hook-shaped locking parts are present, which is able to engage behind an edge on the furniture part, as well as with a stop-forming part which retains the second connection portion in the mounted position;
- as a locking means as in the preceding paragraph, with a part which is able to be inserted from the outside, which forces and/or retains the locking parts in a locking position.

15. The connection device of claim 2, comprising positioning and/or blocking means which prevent or counteract a rotation of the second part in the respective recess and/or provide for a positioning of the second part in the recess.

16. The connection device of claim 15, wherein the respective means comprise at least one of the following possibilities:
- the second part is configured such that it fits with a clamping fit in the respective recess;
- the second part is provided with a structure, providing for an engagement effect;
- the first connection portion, and the second part thereof, as well as the recess are provided with portions engaging in each other, which, in a certain position, fit into each other.

17. The connection device of claim 2, comprising a blocking system which, in the mounted final position, locks the second connection portion and the furniture part cooperating therewith against rotation in respect to the other furniture part.

18. The connection device of claim 17, wherein the blocking system comprises at least one of the following possibilities:
- a pin, which prevents a rotation;
- a locking part, provided on the second connection portion, whether or not made in one piece therewith, which, in said final position, engages in a recess;
- a locking part cooperating with the respective furniture part, which locking part, in said final position, engages in a recess;
- a locking part according to any of the preceding two paragraphs, formed as an elastically bendable lip, with a protrusion which is forced into the recess by the elastic lip when the protrusion, by rotation, has been brought in a position opposite to the recess.

19. The connection device of claim 2, wherein said first part of the spreading system consists of an element having a circumference with varying cross-sectional dimensions, whereas the second part consists of a spreadable body which is located along the circumference thereof.

20. The connection device of claim 19, wherein the first part has a non-cylindrical, however, a rounded cross-section.

21. The connection device of claim 19, wherein the first part is also made conically narrowing towards the second connection portion in order to realize a tensioning force in an axial direction, perpendicular to said at least one spreading direction.

22. The connection device of claim 20, wherein the first part has an elliptical or oval cross-section.

23. A piece of furniture, which comprises at least two furniture parts, which are interconnected by means of a connection device according to claim 1.

24. The piece of furniture of claim 23, wherein at least one of the furniture parts consist of a lath which, at least at one end face, connects to a second furniture part and thereby is connected by means of the connection device.

25. The piece of furniture of claim 24, wherein said lath is an upstanding post of a cabinet.

26. The piece of furniture of claim 23, this piece of furniture being configured such that the second connection portion is provided in one of the furniture parts by means of an insertion movement, after which the spreading system is able to be activated by rotating this furniture part in respect to the other furniture part.

* * * * *